United States Patent
Xu et al.

(10) Patent No.: US 9,047,462 B2
(45) Date of Patent: Jun. 2, 2015

(54) COMPUTER ACCOUNT MANAGEMENT SYSTEM AND REALIZING METHOD THEREOF

(75) Inventors: Zhiwei Xu, Dongguan (CN); Guojie Li, Dongguan (CN); Xiaolin Li, Dongguan (CN); Yi Xie, Dongguan (CN); Qiang Yue, Dongguan (CN)

(73) Assignee: GUANGDONG ELECTRONICS INDUSTRY INSTITUTE LTD., Dongguan, Guangdong (CN)

( * ) Notice: Subject to any disclaimer, the term of this patent is extended or adjusted under 35 U.S.C. 154(b) by 0 days.

(21) Appl. No.: 14/342,121

(22) PCT Filed: Apr. 18, 2012

(86) PCT No.: PCT/CN2012/000535
§ 371 (c)(1),
(2), (4) Date: Feb. 28, 2014

(87) PCT Pub. No.: WO2013/138954
PCT Pub. Date: Sep. 26, 2013

(65) Prior Publication Data
US 2014/0289829 A1    Sep. 25, 2014

(30) Foreign Application Priority Data

Mar. 20, 2012 (CN) .......................... 2012 1 0075795

(51) Int. Cl.
G06F 21/45 (2013.01)
H04L 9/32 (2006.01)
H04L 29/06 (2006.01)

(52) U.S. Cl.
CPC ............. *G06F 21/45* (2013.01); *H04L 9/3263* (2013.01); *H04L 63/0815* (2013.01)

(58) Field of Classification Search
CPC .... G06F 21/45; H04L 9/3263; H04L 63/0815
USPC ............................ 726/6, 26; 709/203; 705/41
See application file for complete search history.

(56) References Cited

U.S. PATENT DOCUMENTS 8,566,208 B1 * 10/2013 Cunningham et al. ...... 705/36 R
2008/0098062 A1 * 4/2008 Balia .............................. 709/203
(Continued)

FOREIGN PATENT DOCUMENTS

| CN | 1855843 | 11/2006 |
|----|---------|---------|
| CN | 100438432 | 11/2008 |

(Continued)

*Primary Examiner* — Haresh N Patel

(57) ABSTRACT

A computer account management system includes: an account management subsystem; an information asset management subsystem; an authentication (integrated) subsystem; a service (integrated) subsystem; and an account portal subsystem; wherein the account management subsystem manages information of physical accounts and logical account numbers; wherein the information asset management subsystem manages data information resources generated by network activities of physical account information; wherein the authentication subsystem provides an authentication integrated interface to the physical account numbers; wherein the service subsystem is a customizable interface which is open to internet or local network; wherein the account portal provides interfaces and tools of login, service list management of services subscribed or bought by the account, account information management and information asset management. The computer account management system is not bundled with services, seamlessly integrated with the user information asset and is lifetime-valid. The system can be used in account management of the internet.

20 Claims, 3 Drawing Sheets

(56) References Cited

U.S. PATENT DOCUMENTS

| | | |
|---|---|---|
| 2009/0276771 A1* | 11/2009 | Nickolov et al. ............. 717/177 |
| 2010/0192207 A1* | 7/2010 | Raleigh ............................. 726/6 |
| 2012/0066062 A1* | 3/2012 | Yoder et al. ................ 705/14.51 |
| 2012/0066064 A1* | 3/2012 | Yoder et al. ................ 705/14.53 |
| 2012/0069131 A1* | 3/2012 | Abelow ..................... 348/14.01 |
| 2013/0132386 A1* | 5/2013 | Runchey ....................... 707/736 |
| 2013/0204872 A1* | 8/2013 | Runchey ....................... 707/736 |
| 2013/0254897 A1* | 9/2013 | Reedy et al. .................... 726/26 |
| 2014/0032436 A1* | 1/2014 | Patel ............................. 705/321 |
| 2014/0223573 A1* | 8/2014 | Reedy et al. .................... 726/26 |
| 2014/0289829 A1* | 9/2014 | Xu et al. .......................... 726/6 |
| 2014/0365363 A1* | 12/2014 | Knudsen et al. ................ 705/41 |

FOREIGN PATENT DOCUMENTS

| | | |
|---|---|---|
| CN | 101951598 | 1/2011 |
| CN | 102209137 | 10/2011 |
| WO | 2009064318 | 5/2009 |

\* cited by examiner

COMPUTER ACCOUNT MANAGEMENT SYSTEM AND REALIZING METHOD THEREOF

CROSS REFERENCE OF RELATED APPLICATION

This is a U.S. National Stage under 35 U.S.C 371 of the International Application PCT/CN2012/000535, filed Apr. 18, 2012, which claims priority under 35 U.S.C. 119(a-d) to CN 201210075795.3, filed Mar. 20, 2012.

BACKGROUND OF THE PRESENT INVENTION

1. Field of Invention

The present invention relates to a field of computer application technology, and more particularly to a computer account management system and a realizing method thereof.

2. Description of Related Arts

In the conventional network service environment in the world, one or more accounts should be registered for using the services of a service provider. As a result, a lot of user names and codes need to be maintained. On one hand, the complex authentication method has been a burden or even an obstacle of the users, and online frauds such as code steal and identity steal are easy. Internet enterprises must face the increasing cost of user account management and huge losses due to the online frauds. On the other hand, personal information and personal information asset generated during the service are dispersed to independent account systems of different service providers. Not only the user pays for the services, but also the personal information asset of the user will naturally become the information asset of the service provider and even be used illegally. Besides, lifetime personal information asset is difficult to be formed centrally.

The above technical problem is due to the lack of a universal computer account (UCA) management system for the conventional internet services. At present, computer and internet have almost been necessities for the daily lives of most people. Popularity rate of personal or home computers are higher and higher. However, user systems, as the first thing for accessing and utilizing the internet, are independently developed by different service providers according to requirements, arrangements and operation of the services. No unified standard of user information is formed. Security requirements and authentication methods are different. Therefore, Users are obliged to meet the requirements of service providers by registering different sets of personal information for different service website and managing the user names, codes, certifications, etc. The user information and asset are directly bundled with the service provider. And no universal computer account system is provided in the special personal computer of the user for providing a universal computer account system which is not bundled with any service (provider), seamlessly integrated with the user information asset and is lifetime-valid.

The basic demand tendency of internet services, especially cloud computing services, is professionalized and nostation network services. Being professionalized means providing specialized and professionalized service functions to the specific audience for decreasing costs of development, arrangement, operation and management of the services for the audience. Being no-station means seamless integration ability as well as transparent operation and maintenance ability of providing transparent (that is to say, cloud service developer is not involved) resources and services for the professionalized service. Therefore, decreasing the integration cost of resource server for providing convenient service and improving cloud experience of the client for providing no-station service are the basic requirements for the conventional internet services, especially cloud computing. And research and development of universal computer account system are the basic and foundation for providing cross-provider and cross-system seamless integration of server resources and improving no-station cloud service experience of the clients.

SUMMARY OF THE PRESENT INVENTION

An object of the present invention is to provide a computer account management system for providing a universal computer account system which is not bundled with the service (provider), seamlessly integrated with the user information asset and is lifetime-valid, in such a manner that a self-owned, safe, convenient and interoperable account portal for accessing and utilizing network services compatible with a standard interface of a UCA account is provided.

Another object of the present invention is to provide a realizing method of the computer account management system for solving problems that conventional user systems are independently developed and operated by service providers; no unified standard is formed; and users need to manage a lot of independent user names and codes, which will lead to inconvenient use, insecurity as well as user data dispersal. Furthermore, high costs of redevelopment and management of the user system are also decreased.

Accordingly, in order to accomplish the above objects, the present invention provides a computer account management system, comprising:

an account management subsystem;
an information asset management subsystem;
an authentication (integrated) subsystem;
a service (integrated) subsystem; and
an account portal subsystem;

wherein the account management subsystem manages account information in two layers and mapping relationships; first, the account management subsystem manages account information in a physical layer by creating, modifying, deleting and maintaining basic attribute information of real humans; second, the account management subsystem manages logical account number information by dynamically creating, modifying, deleting and maintaining certain identity information for being bundled with services utilized by a user on an information network, wherein by dynamically creating the identity and attribute information as well as automatically bundling or unbundling the information to a certain network service through an account system, a physical account is mapped to zero or a plurality of logical user account numbers;

wherein the information asset management subsystem provides lifetime management for data information resources generated by network activities of active physical account information;

wherein the authentication subsystem provides an authentication integrated interface to the physical account numbers for confirming validity and authenticity thereof and issuing digital certificates;

wherein the service subsystem provides interactive interfaces for the account management subsystem, the information asset management subsystem and services provided by service providers; according to the logical account number bundled to the service, functions comprising account or account number information acquisition or authentication, view design and integration of information asset, information synchronization and consistency maintenance are provided;

the service subsystem is a customizable interface which is open to internet or local network;

wherein the account portal provides interfaces and tools of login, service list management of services subscribed or bought by the account, account information management and information asset management.

Preferably, the account management subsystem comprises:

an account or code authentication system; and a digital certification management system.

Preferably, according to the physical accounts, the information asset management system designs a certain information view of data asset generated by the logical account numbers in each information world; with classified storage, organizing and maintenance management, an account asset management system completely independent of the service providers is formed; when the logical account number is out of lifetime, date information generated keeps valid; the information asset management system also provides unified storage, management and access functions for relative date comprising the physical accounts and the logical account numbers.

Preferably, the service subsystem provides four interface functions comprising an information view function, an identity authentication function, an information synchronization function and an interface customization function;

wherein the information view is automatically bundled with the logical account number of the service for representing physical account identity; an information view mode to be stored is customized according to a mode of date information generated during service exchange; then the information view mode is mapped to a virtual table in an asset management subsystem for exchanging date between the service and the information asset through a view defined;

wherein for services requiring system identity authentication, an interface connecting the services to the system account information acquisition or authentication is needed; for services directly based on a UCA system standard, the interface is still needed for development;

wherein the information synchronization function sets an information synchronization policy; the account utilizes the logical account number for acquiring date from the service manually or according to the information synchronization policy;

wherein the interface customization function provides an integrated extensible interface for the services and the system.

Preferably, the login interface, the service list management interface, the account management interface and the asset management interface are provided;

wherein the login interface provides one-time login for the account, and after the login, a list of services which is accessible and a management menu are provided;

wherein the service list management interface manages and subscribes a list of services to be accessed; when a new service is added, an interface for creating a logical account number will be provided in time if necessary;

wherein the account management interface creates, modifies and maintains the account information, the account management interface also restricts users except administrators to management of their own account and account number information;

wherein the asset management interface defines a view and mapping interface, as well as a synchronization policy interface.

The present invention provides a realizing method of the computer account management system;

wherein in the computer account management system with two servers, a default administrator account is utilized for system arrangement and initialization;

from the arrangement and the initialization to system operation, the realizing method comprises steps of:

a) installing the system on every node, then configuring other server nodes in a configuration file of the present node;

b) arranging an initial environment by said initialization:

b-1) creating a No. 0 community of a system community in a local server, wherein a default data base server and a default data base mapped to the No. 0 community are set, an initializing virtual table is mapped to a physical base table and is finally stored in the default data base; initialized resources comprises a virtual account table, a virtual account number table and an asset virtual table; of course, whether the tables are arranged or arranged in the No. 0 community is selectable according to practical applications, and other virtual tables may also be arranged; and b-2) initialing the administrator account of the system;

c) logging in the No. 0 community in the local server with the administrator account, wherein the No. 0 community provides a function for creating communities; the administrator creates a No. n community by the function; when creating a community, the virtual tables are automatically arranged, storage addresses of the virtual tables mapped to the physical base table should be selected; each of the community created should have a community administrator, the community administrator is capable of adding and managing virtual table resources of the community after login, the community administrator also manages other accounts registered in the community; all the accounts in the community is capable of arranging and managing their own asset virtual tables; likewise, a No. m community is created at another node; configuration files of the communities on different nodes are synchronously copied to other service node for ensuring that each of the communities on different nodes has a unique number; and d) marking a service interface developed for any of the communities with the community; wherein a virtual table number transparently accesses an asset subsystem through an access interface of the virtual table; wherein a programmer do not need the community account; when the program is running, the asset management subsystem will define whether the virtual table is accessible or not according to an identity of a user.

Preferably, the realizing method specifically comprises:

logging in a system portal or registering a new physical account by the user, which is a procedure S1; determining by the system whether user authentication is needed for the newly registered physical account for confirming authenticity and validity, which is a procedure S2; jumping to a procedure S4 if the user authentication is not needed or the account already exists; authenticating a digital identity certification provided by the user with an authentication subsystem, which is a procedure S3; checking a list of services owned or available according to the account, which is the procedure S4; checking whether a target service is on the available service list or not, which is a procedure S5; jumping to a procedure S8 if the target service is on the available service list; seamlessly accessing to the target service through a service integrated uniform interface, which is a procedure S6; turning to an individual asset management interface and defining an information view of the target service, which is a procedure S7; selecting the target service to be accessed, which is the procedure S8; checking whether the target service is able to be accessed directly with a physical account number, which is a procedure S9; jumping to a procedure S11 if the target is able to be accessed directly with the physical account number; creating a logical account number and dynamically bundling the logical account number with the target service for accessing, which is a procedure S10; sending a service requirement to the target service, which is the procedure S11; receiving response data from the target service, which is a procedure S12.

From a view point of the user rather than of the service providers, a universal computer account (UCA) system is developed according to the present invention. The UCA system centrally and systematically manages real people, multi-identity in an information world and life cycles of production activity data for avoiding problems that a real person should separately record and manage a lot of account information for certain service providers, and user data asset is dispersed and is not able to be integrated and reused effectively. With the universal computer account system which is not bundled with the service (provider), seamlessly integrated with the user information asset and is lifetime-valid, a self-owned, safe, convenient and interoperable account portal for accessing and utilizing network services compatible with a standard interface of a UCA account is provided.

According to the present invention, after logging in the universal computer account (UCA) system, the user is able to access the network services provided by different service providers which are compatible with the standard interface of the UCA account by a no-station method (wherein the system will automatically switch between the logical account numbers), in such a manner that cross-provider and cross-system seamless integration is provided. Server resources are integrated by the service providers (such as cloud service provider) by a convenient method. Information differences that certain user identity should be provided for centrally accessing different resource systems and access problems do not need to be concerned about. Therefore, resource service costs and maintenance costs of cloud computing are greatly decreased. And cloud service experiences of the users are improved.

Network services developed based on the present invention or the conventional network services integrated with the present invention can be accessed by the users by the no-station method through a unified universal account. Without inconvenient records of independent account numbers or codes, and with lifetime-valid management and utilization of the own information asset, the user account is not bundled with certain service providers, and switching the services (providers) is as convenient as switching TV channels.

These and other objectives, features, and advantages of the present invention will become apparent from the following detailed description, the accompanying drawings, and the appended claims.

BRIEF DESCRIPTION OF THE DRAWINGS

Referring to the drawings, the present invention is further illustrated.

DETAILED DESCRIPTION OF THE PREFERRED EMBODIMENT

A part of an information asset management subsystem according to the present invention is based on Chinese patent CN 200810119858.4 (Network system and management method thereof). Communities, virtual tables and management as well as utilization methods thereof are quoted from the Chinese patent.

Figure 1:
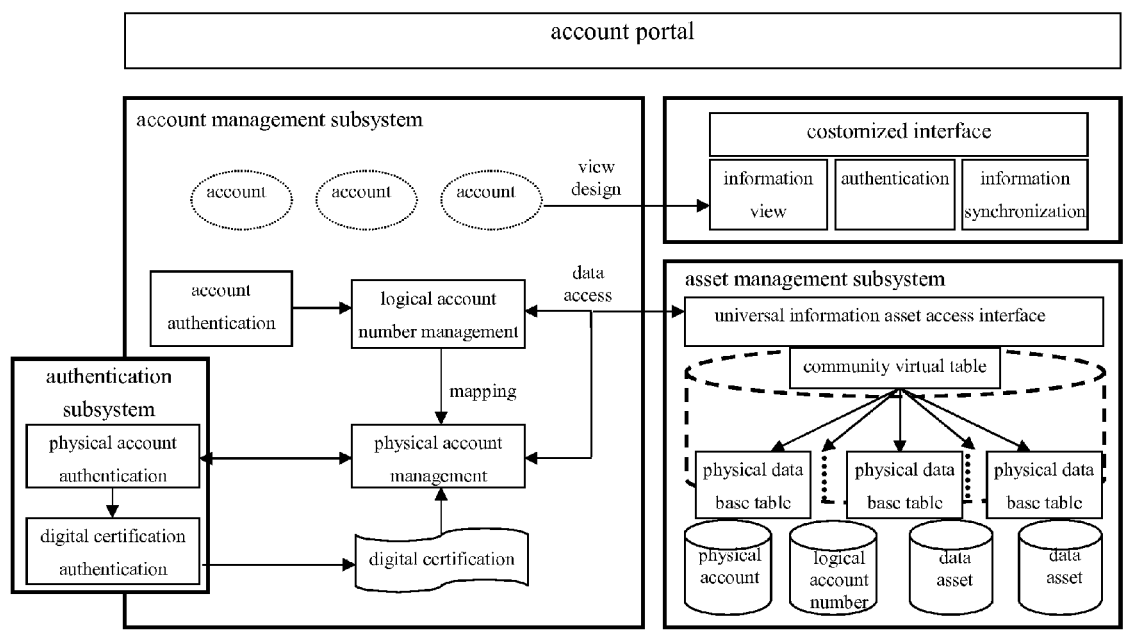
FIG. 1 is a schematic view of a universal computer account (UCA) management system according to a preferred embodiment of the present invention.

Referring to FIG. 1 of the drawings, a sketch view of a universal computer account (UCA) management system according to a preferred embodiment of the present invention is provided. For realizing universal account management, five key subsystems and invoking relationships therebetween are provided. Specifically, the five subsystems are:

a) an account management subsystem comprising physical account management and logical account number management;

a-1) wherein in the physical account management, a core thereof is management of identity information of real people; a basic flow of the physical account management is: 1) registering an account through an account portal by a user; 2) handing over a physical account sheet comprising: name, code, gender, birthday, address, telephone number, etc, wherein the attributes are extensible by adding attributes to a virtual table of the account; and 3) checking the physical account information by a system administrator of the account management (in an operation center) (wherein if the system is installed locally with only one user, the step 3) can be omitted), applying to an authentication mechanism for obtaining an authorized digital certification for being a valid account if the digital certification is needed;

a-2) wherein in the logical account number management, a core thereof is management of multi-identity in an information world; each of the identities is a certain mark of the physical account; a flow of the logical account management is a dynamic procedure relative to a flow of accessing services, a basic flow is: 1) logging in the account portal with the physical account or code, finding the service through the interface (wherein the services are developed based on a standard interface of the UCA system or integrated with network services of the UCA), wherein if the service is able to be accessed directly by the physical account, following step 2) and step 3) are omitted; 2) handing over an identity information sheet of logical account number according to requirements of the service, wherein the information to be delivered is related to the service; generally, a unique ID is needed; and the attributes are extensible by adding attributes to the virtual table of the account; 3) automatically bundling the logical identity with the service; 4) accessing the service (wherein the digital certification relative to the physical account may be presented to the service for safe authentication); 5) defining an information data asset view during interactivities with the service by the logical account number, so as to create the information view and map the information view to an asset virtual table in an asset management subsystem in such a manner that the asset management subsystem is capable of obtaining relative information assets; and 6) applying for obtaining newly generated information asset by the logical account (or setting an automatic obtaining policy);

b) the asset management subsystem;

wherein the asset management subsystem provides unified storage, management and access to data relative to the UCA system such as the physical account, the logical account and the information asset; a data virtual mechanism with communities and virtual tables of the asset management subsystem provides a unified transparent interface; a physical layer utilizes a data base and a file system for storing data; because the communities and the virtual tables are online-extensible, the universal computer account (UCA) system is able to manage billions of users in theory; each of the community of the asset management system comprises three kinds of the virtual tables: a virtual account table for storing physical account information; a virtual account number table for storing logical account number information; and an asset virtual table for storing user information asset; attributes of the three kinds of the virtual tables are extensible; the first two kinds of the virtual tables belong to the administrator of the UCA and cannot be created or modified by other users; the asset virtual table is mapped by defining the information view by the account with the logical account number according to a schema of the service; the asset virtual table (and the physical data entities mapped thereto) belongs to an owner of the physical account having the logical account number and is a private information asset which is not able to be accessed by other users; physically, different users (tenants) can share a same data base or data base table, which is a multitenant application mode;

c) an authentication (integrated) subsystem;

wherein the authentication subsystem provides an integrated interface for authentication which is needed for confirming validity and authenticity; the authentication subsystem also provides an authentication requirement interface and a certification obtaining interface for a third party or a credible verification organization;

d) a service (integrated) subsystem;

wherein the service (integrated) subsystem provides four interface functions; the interface functions should be supported by the relative interfaces provided by the service providers according to a standard of the universal computer account (UCA) system during development and integration of the services; the four interface functions are:

d-1) an information view function; wherein the information view is automatically bundled with the logical account number of the service for representing the physical account identity; an information view mode (comprising attribute selection and format transformation) to be stored is customized according to a schema of date information generated during service exchange; then the information view mode is mapped to a virtual table in an asset management subsystem for exchanging date between the service and the information asset through a view defined; the information view function should be supported by an interface provided by the service for obtaining the schema;

d-2) an authentication function; wherein for services requiring UCA system identity authentication, an interface connecting the services to the UCA system account information acquisition or authentication is needed; for services directly based on a UCA system standard, the interface is still needed for development;

d-3) an information synchronization function, wherein the information synchronization function sets an information synchronization policy (synchronization period, frequency and renewing method (comprising renewing all or adding)); the account utilizes the logical account number for acquiring date from the service manually or according to the information synchronization policy; the information synchronization function should be supported by an interface provided by the service for obtaining the schema; and d-4) an interface customization function, wherein the interface customization function provides an integrated extensible interface for the services (providers) and the UCA system.

e) an account portal;

wherein, the account portal provides following interfaces;

e-1) a login interface; wherein the login interface provides one-time login for the account, and after the login, a list of services which is accessible and a management menu are provided;

e-2) a service list management interface; wherein the service list management interface manages and subscribes a list of services to be accessed; when a new service is added, an interface for creating a logical account number will be provided in time if necessary;

e-3) an account management interface; wherein the account (number) management interface creates, modifies and maintains the account information, the account management interface also restricts users except administrators to management of their own account and account number information; and e-4) an asset management interface; wherein the asset management interface defines a view and mapping interface, as well as a synchronization policy interface.

Figure 2:
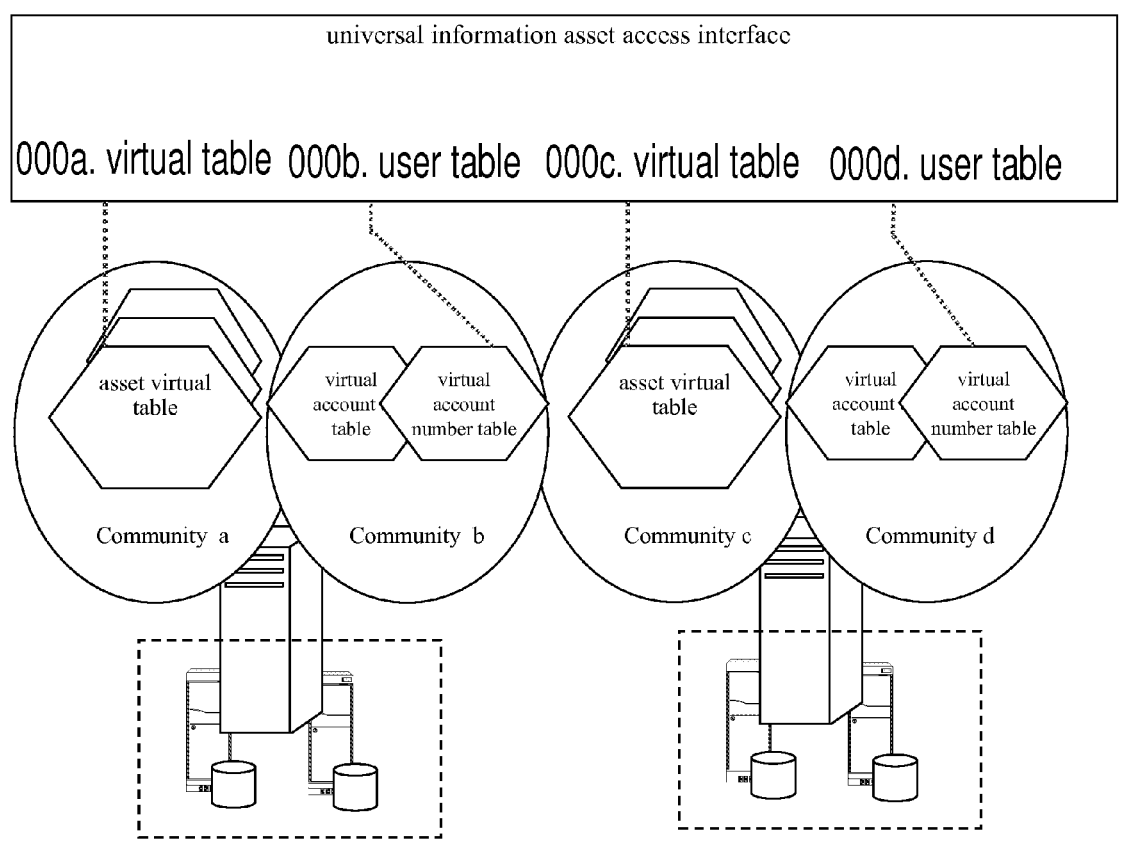
FIG. 2 is a schematic view of arrangement and access of an information asset subsystem based on communities and virtual tables according to the preferred embodiment of the present invention.

Referring to FIG. 2 of the drawings, a sketch view of arrangement and access of the communities, the virtual tables and data storage of the information asset subsystem in the UCA system with two servers is provided; wherein a default administrator account is utilized for UCA system arrangement and initialization;

from the arrangement and the initialization to system operation, the realizing method comprises steps of:

a) installing the system on every node, then configuring other server nodes in a configuration file of the present node;

b) arranging an initial environment by said initialization:

b-1) creating a No. 0 community of a system community in a local server, wherein a default data base server and a default data base mapped to the No. 0 community are set, an initializing virtual table is mapped to a physical base table and is finally stored in the default data base; initialized resources comprises a virtual account table, a virtual account number table and an asset virtual table; of course, whether the tables are arranged or arranged in the No. 0 community is selectable according to practical applications, and other virtual tables may also be arranged; and b-2) initialing the administrator account of the system;

c) logging in the No. 0 community in the local server with the administrator account, wherein the No. 0 community provides a function for creating communities; the administrator creates a No. n community by the function; when creating a community, the virtual tables are automatically arranged, storage addresses of the virtual tables mapped to the physical base table should be selected; each of the community created should have a community administrator, the community administrator is capable of adding and managing virtual table resources of the community after login, the community administrator also manages other accounts registered in the community; all the accounts in the community is capable of arranging and managing their own asset virtual tables; likewise, a No. m community is created at another node; configuration files of the communities on different nodes are synchronously copied to other service node for ensuring that each of the communities on different nodes has a unique number; and d) marking a service interface developed for any of the communities with the community; wherein a virtual table number (in a form of cid.vid) transparently accesses an asset subsystem through an access interface of the virtual table; wherein a programmer do not need the community account; when the program is running, the asset management subsystem will define whether the virtual table is accessible or not according to an identity of a user.

Figure 3:
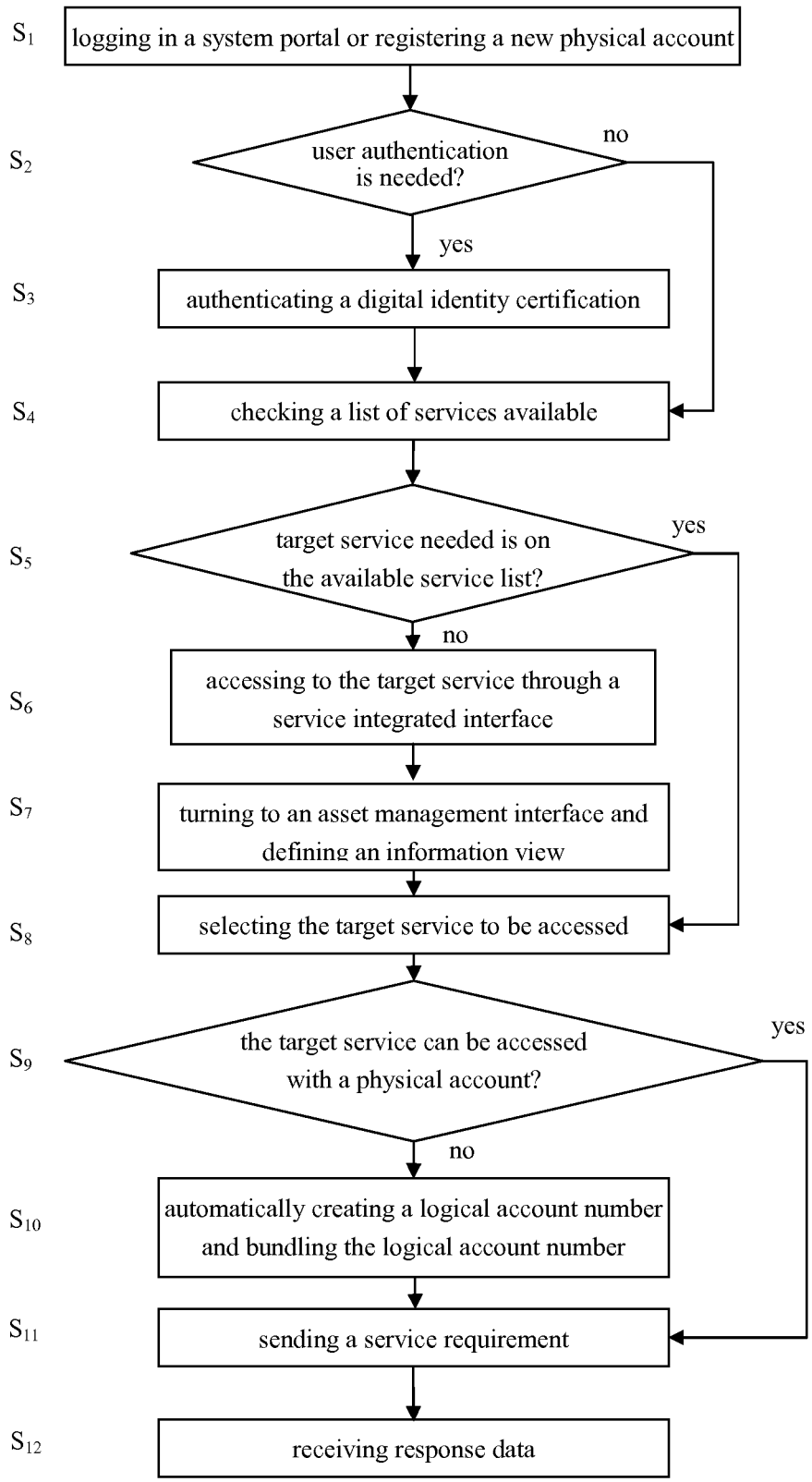
FIG. 3 is a flow chart of the universal computer account (UCA) system according to the preferred embodiment of the present invention.

Referring to FIG. 3 of the drawings, a flow chart of utilizing the universal computer account (UCA) system is illustrated, comprising: logging in a system portal or registering a new physical account by the user, which is a procedure S1; determining by the system whether user authentication is needed for the newly registered physical account for confirming authenticity and validity, which is a procedure S2; jumping to a procedure S4 if the user authentication is not needed or the account already exists; authenticating a digital identity certification provided by the user with an authentication subsystem, which is a procedure S3; checking a list of services owned or available according to the account, which is the procedure S4; checking whether a target service is on the available service list or not, which is a procedure S5; jumping to a procedure S8 if the target service is on the available service list; seamlessly accessing to the target service through a service integrated uniform interface, which is a procedure S6; turning to an individual asset management interface and defining an information view of the target service, which is a procedure S7; selecting the target service to be accessed, which is the procedure S8; checking whether the target service is able to be accessed directly with a physical account number, which is a procedure S9; jumping to a procedure S11 if the target is able to be accessed directly with the physical account number; creating a logical account number and dynamically bundling the logical account number with the target service for accessing, which is a procedure S10; sending a service requirement to the target service, which is the procedure S11; receiving response data from the target service, which is a procedure S12.

Advantages according to the present invention are as follows. First, the user account is not bundled with any of the service providers, and switching the services is as convenient as switching TV channels. Second, the data information assets generated during utilization of the network services are able to be seamlessly integrated by to the user. Third, the user data assets are lifetime-valid and are individually manageable as well as controllable; furthermore, the user data assets are inheritable.

In view of utilization modes, two user modes are supported according to the present invention, comprising: a) a single-user mode: wherein the single-user mode is able to be installed in a personal computer of the user as an account portal system for login and utilization of the internet; and b) a multi-user mode: wherein account services are centrally operated and provided by independent and creditable account operators (or nonprofit government organizations); clients (with a Clinet/Server or Browser/Server mode) in the personal computer of the user accesses the account system at first, then accesses and utilizes the internet after obtaining an identity.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A computer account management system, comprising:
an account management subsystem;
an information asset management subsystem;
an authentication (integrated) subsystem;
a service (integrated) subsystem; and
an account portal subsystem;
wherein said account management subsystem manages account information in two layers and mapping relationships; first, said account management subsystem manages account information in a physical layer by creating, modifying, deleting and maintaining basic attribute information of real humans; second, said account management subsystem manages logical account number information by dynamically creating, modifying, deleting and maintaining certain identity information for being bundled with services utilized by a user on an information network, wherein by dynamically creating said identity and attribute information as well as automatically bundling or unbundling said information to a certain network service through an account system, a physical account is mapped to zero or a plurality of logical user account numbers;
wherein said information asset management subsystem provides lifetime management for data information resources generated by network activities of active physical account information;
wherein said authentication subsystem provides an authentication integrated interface to said physical account numbers for confirming validity and authenticity thereof and issuing digital certificates;
wherein said service subsystem provides interactive interfaces for said account management subsystem, said information asset management subsystem and services provided by service providers; according to said logical account number bundled to said service, functions comprising account or account number information acquisition or authentication, view design and integration of information asset, information synchronization and consistency maintenance are provided; said service subsystem is a customizable interface which is open to internet or local network;
wherein said account portal provides interfaces and tools of login, service list management of services subscribed or bought by said account, account information management and information asset management.

2. The computer account management system, as recited in claim 1, wherein said account management subsystem comprises:
an account or code authentication system; and
a digital certification management system.

3. The computer account management system, as recited in claim 1, wherein according to said physical accounts, said information asset management system designs a certain information view of data asset generated by said logical account numbers in each information world; with classified storage, organizing and maintenance management, an account asset management system completely independent of said service providers is formed; when said logical account number is out of lifetime, date information generated keeps valid; said information asset management system also provides unified storage, management and access functions for relative date comprising said physical accounts and said logical account numbers.

4. The computer account management system, as recited in claim 2, wherein according to said physical accounts, said information asset management system designs a certain information view of data asset generated by said logical account numbers in each information world; with classified storage, organizing and maintenance management, an account asset management system completely independent of said service providers is formed; when said logical account number is out of lifetime, date information generated keeps valid; said information asset management system also provides unified storage, management and access functions for relative date comprising said physical accounts and said logical account numbers.

5. The computer account management system, as recited in claim 1, wherein said service subsystem provides four interface functions comprising an information view function, an identity authentication function, an information synchronization function and an interface customization function;

wherein said information view function automatically bundles said service with said logical account number for representing physical account identity; an information view mode to be stored is customized according to a mode of date information generated during service exchange; then said information view mode is mapped to a virtual table in an asset management subsystem for exchanging date between said service and said information asset through a view defined;

wherein for services requiring system identity authentication, an interface connecting said services to said system account information acquisition or authentication is needed; for services directly based on a UCA system standard, said interface is still needed for development;

wherein said information synchronization function sets an information synchronization policy; said account utilizes said logical account number for acquiring date from said service manually or according to said information synchronization policy;

wherein said interface customization function provides an integrated extensible interface for said services and said system.

6. The computer account management system, as recited in claim 2, wherein said service subsystem provides four interface functions comprising an information view function, an identity authentication function, an information synchronization function and an interface customization function;

wherein said information view function automatically bundles said service with said logical account number for representing physical account identity; an information view mode to be stored is customized according to a mode of date information generated during service exchange; then said information view mode is mapped to a virtual table in an asset management subsystem for exchanging date between said service and said information asset through a view defined;

wherein for services requiring system identity authentication, an interface connecting said services to said system account information acquisition or authentication is needed; for services directly based on a UCA system standard, said interface is still needed for development;

wherein said information synchronization function sets an information synchronization policy; said account utilizes said logical account number for acquiring date from said service manually or according to said information synchronization policy;

wherein said interface customization function provides an integrated extensible interface for said services and said system.

7. The computer account management system, as recited in claim 3, wherein said service subsystem provides four interface functions comprising an information view function, an identity authentication function, an information synchronization function and an interface customization function;

wherein said information view function automatically bundles said service with said logical account number for representing physical account identity; an information view mode to be stored is customized according to a mode of date information generated during service exchange; then said information view mode is mapped to a virtual table in an asset management subsystem for exchanging date between said service and said information asset through a view defined;

wherein for services requiring system identity authentication, an interface connecting said services to said system account information acquisition or authentication is needed; for services directly based on a UCA system standard, said interface is still needed for development;

wherein said information synchronization function sets an information synchronization policy; said account utilizes said logical account number for acquiring date from said service manually or according to said information synchronization policy;

wherein said interface customization function provides an integrated extensible interface for said services and said system.

8. The computer account management system, as recited in claim 4, wherein said service subsystem provides four interface functions comprising an information view function, an identity authentication function, an information synchronization function and an interface customization function;

wherein said information view function automatically bundles said service with said logical account number for representing physical account identity; an information view mode to be stored is customized according to a mode of date information generated during service exchange; then said information view mode is mapped to a virtual table in an asset management subsystem for exchanging date between said service and said information asset through a view defined;

wherein for services requiring system identity authentication, an interface connecting said services to said system account information acquisition or authentication is needed; for services directly based on a UCA system standard, said interface is still needed for development;

wherein said information synchronization function sets an information synchronization policy; said account utilizes said logical account number for acquiring date from said service manually or according to said information synchronization policy;

wherein said interface customization function provides an integrated extensible interface for said services and said system.

9. The computer account management system, as recited in claim 1, wherein said login interface, said service list management interface, said account management interface and said asset management interface are provided;

wherein said login interface provides one-time login for said account, and after said login, a list of services which is accessible and a management menu are provided;

wherein said service list management interface manages and subscribes a list of services to be accessed; when a new service is added, an interface for creating a logical account number will be provided in time if necessary;

wherein said account management interface creates, modifies and maintains said account information, said account management interface also restricts users except administrators to management of their own account and account number information;

wherein said asset management interface defines a view and mapping interface, as well as a synchronization policy interface.

10. The computer account management system, as recited in claim 2, wherein said login interface, said service list management interface, said account management interface and said asset management interface are provided;
    wherein said login interface provides one-time login for said account, and after said login, a list of services which is accessible and a management menu are provided;
    wherein said service list management interface manages and subscribes a list of services to be accessed; when a new service is added, an interface for creating a logical account number will be provided in time if necessary;
    wherein said account management interface creates, modifies and maintains said account information, said account management interface also restricts users except administrators to management of their own account and account number information;
    wherein said asset management interface defines a view and mapping interface, as well as a synchronization policy interface.

11. The computer account management system, as recited in claim 3, wherein said login interface, said service list management interface, said account management interface and said asset management interface are provided;
    wherein said login interface provides one-time login for said account, and after said login, a list of services which is accessible and a management menu are provided;
    wherein said service list management interface manages and subscribes a list of services to be accessed; when a new service is added, an interface for creating a logical account number will be provided in time if necessary;
    wherein said account management interface creates, modifies and maintains said account information, said account management interface also restricts users except administrators to management of their own account and account number information;
    wherein said asset management interface defines a view and mapping interface, as well as a synchronization policy interface.

12. The computer account management system, as recited in claim 4, wherein said login interface, said service list management interface, said account management interface and said asset management interface are provided;
    wherein said login interface provides one-time login for said account, and after said login, a list of services which is accessible and a management menu are provided;
    wherein said service list management interface manages and subscribes a list of services to be accessed; when a new service is added, an interface for creating a logical account number will be provided in time if necessary;
    wherein said account management interface creates, modifies and maintains said account information, said account management interface also restricts users except administrators to management of their own account and account number information;
    wherein said asset management interface defines a view and mapping interface, as well as a synchronization policy interface.

13. The computer account management system, as recited in claim 5, wherein said login interface, said service list management interface, said account management interface and said asset management interface are provided;
    wherein said login interface provides one-time login for said account, and after said login, a list of services which is accessible and a management menu are provided;
    wherein said service list management interface manages and subscribes a list of services to be accessed; when a new service is added, an interface for creating a logical account number will be provided in time if necessary;
    wherein said account management interface creates, modifies and maintains said account information, said account management interface also restricts users except administrators to management of their own account and account number information;
    wherein said asset management interface defines a view and mapping interface, as well as a synchronization policy interface.

14. The computer account management system, as recited in claim 6, wherein said login interface, said service list management interface, said account management interface and said asset management interface are provided;
    wherein said login interface provides one-time login for said account, and after said login, a list of services which is accessible and a management menu are provided;
    wherein said service list management interface manages and subscribes a list of services to be accessed; when a new service is added, an interface for creating a logical account number will be provided in time if necessary;
    wherein said account management interface creates, modifies and maintains said account information, said account management interface also restricts users except administrators to management of their own account and account number information;
    wherein said asset management interface defines a view and mapping interface, as well as a synchronization policy interface.

15. The computer account management system, as recited in claim 7, wherein said login interface, said service list management interface, said account management interface and said asset management interface are provided;
    wherein said login interface provides one-time login for said account, and after said login, a list of services which is accessible and a management menu are provided;
    wherein said service list management interface manages and subscribes a list of services to be accessed; when a new service is added, an interface for creating a logical account number will be provided in time if necessary;
    wherein said account management interface creates, modifies and maintains said account information, said account management interface also restricts users except administrators to management of their own account and account number information;
    wherein said asset management interface defines a view and mapping interface, as well as a synchronization policy interface.

16. The computer account management system, as recited in claim 8, wherein said login interface, said service list management interface, said account management interface and said asset management interface are provided;
    wherein said login interface provides one-time login for said account, and after said login, a list of services which is accessible and a management menu are provided;
    wherein said service list management interface manages and subscribes a list of services to be accessed; when a new service is added, an interface for creating a logical account number will be provided in time if necessary;
    wherein said account management interface creates, modifies and maintains said account information, said account management interface also restricts users except administrators to management of their own account and account number information;
    wherein said asset management interface defines a view and mapping interface, as well as a synchronization policy interface.

17. A realizing method of the computer account management system as recited in claim 1, wherein in the computer account management system with two servers, a default administrator account is utilized for system arrangement and initialization;

from said arrangement and said initialization to system operation, the realizing method comprises steps of:
a) installing the system on every node, then configuring other server nodes in a configuration file of the present node;
b) arranging an initial environment by said initialization:
b-1) creating a No. 0 community of a system community in a local server, wherein a default data base server and a default data base mapped to the No. 0 community are set, an initializing virtual table is mapped to a physical base table and is finally stored in the default data base; initialized resources comprises a virtual account table, a virtual account number table and an asset virtual table; of course, whether the tables are arranged or arranged in the No. 0 community is selectable according to practical applications, and other virtual tables may also be arranged; and
b-2) initialing the administrator account of the system;
c) logging in the No. 0 community in the local server with the administrator account, wherein the No. 0 community provides a function for creating communities; the administrator creates a No. n community by the function; when creating a community, the virtual tables are automatically arranged, storage addresses of the virtual tables mapped to the physical base table should be selected; each of the community created should have a community administrator, the community administrator is capable of adding and managing virtual table resources of the community after login, the community administrator also manages other accounts registered in the community; all the accounts in the community is capable of arranging and managing their own asset virtual tables; likewise, a No. m community is created at another node; configuration files of the communities on different nodes are synchronously copied to other service node for ensuring that each of the communities on different nodes has a unique number; and
d) marking a service interface developed for any of the communities with the community; wherein a virtual table number transparently accesses an asset subsystem through an access interface of the virtual table; wherein a programmer do not need the community account; when the program is running, the asset management subsystem will define whether the virtual table is accessible or not according to an identity of a user.

18. A realizing method of the computer account management system as recited in claim 16, wherein in the computer account management system with two servers, a default administrator account is utilized for system arrangement and initialization;

from said arrangement and said initialization to system operation, the realizing method comprises steps of:
a) installing the system on every node, then configuring other server nodes in a configuration file of the present node;
b) arranging an initial environment by said initialization:
b-1) creating a No. 0 community of a system community in a local server, wherein a default data base server and a default data base mapped to the No. 0 community are set, an initializing virtual table is mapped to a physical base table and is finally stored in the default data base; initialized resources comprises a virtual account table, a virtual account number table and an asset virtual table; of course, whether the tables are arranged or arranged in the No. 0 community is selectable according to practical applications, and other virtual tables may also be arranged; and
b-2) initialing the administrator account of the system;
c) logging in the No. 0 community in the local server with the administrator account, wherein the No. 0 community provides a function for creating communities; the administrator creates a No. n community by the function; when creating a community, the virtual tables are automatically arranged, storage addresses of the virtual tables mapped to the physical base table should be selected; each of the community created should have a community administrator, the community administrator is capable of adding and managing virtual table resources of the community after login, the community administrator also manages other accounts registered in the community; all the accounts in the community is capable of arranging and managing their own asset virtual tables; likewise, a No. m community is created at another node; configuration files of the communities on different nodes are synchronously copied to other service node for ensuring that each of the communities on different nodes has a unique number; and
d) marking a service interface developed for any of the communities with the community; wherein a virtual table number transparently accesses an asset subsystem through an access interface of the virtual table; wherein a programmer do not need the community account; when the program is running, the asset management subsystem will define whether the virtual table is accessible or not according to an identity of a user.

19. The realizing method, as recited in claim 17, specifically comprising:

logging in a system portal or registering a new physical account by the user, which is a procedure S1; determining by the system whether user authentication is needed for the newly registered physical account for confirming authenticity and validity, which is a procedure S2; jumping to a procedure S4 if the user authentication is not needed or the account already exists; authenticating a digital identity certification provided by the user with an authentication subsystem, which is a procedure S3; checking a list of services owned or available according to the account, which is the procedure S4; checking whether a target service is on the available service list or not, which is a procedure S5; jumping to a procedure S8 if the target service is on the available service list; seamlessly accessing to the target service through a service integrated uniform interface, which is a procedure S6; turning to an individual asset management interface and defining an information view of the target service, which is a procedure S7; selecting the target service to be accessed, which is the procedure S8; checking whether the target service is able to be accessed directly with a physical account number, which is a procedure S9; jumping to a procedure S11 if the target is able to be accessed directly with the physical account number; creating a logical account number and dynamically bundling the logical account number with the target service for accessing, which is a procedure S10; sending a service requirement to the target service, which is the procedure S11; receiving response data from the target service, which is a procedure S12.

20. The realizing method, as recited in claim 18, specifically comprising:

logging in a system portal or registering a new physical account by the user, which is a procedure S1; determining by the system whether user authentication is needed for the newly registered physical account for confirming authenticity and validity, which is a procedure S2; jumping to a procedure S4 if the user authentication is not needed or the account already exists; authenticating a digital identity certification provided by the user with an authentication subsystem, which is a procedure S3; checking a list of services owned or available according to the account, which is the procedure S4; checking whether a target service is on the available service list or not, which is a procedure S5; jumping to a procedure S8 if the target service is on the available service list; seamlessly accessing to the target service through a service integrated uniform interface, which is a procedure S6; turning to an individual asset management interface and defining an information view of the target service, which is a procedure S7; selecting the target service to be accessed, which is the procedure S8; checking whether the target service is able to be accessed directly with a physical account number, which is a procedure S9; jumping to a procedure S11 if the target is able to be accessed directly with the physical account number; creating a logical account number and dynamically bundling the logical account number with the target service for accessing, which is a procedure S10; sending a service requirement to the target service, which is the procedure S11; receiving response data from the target service, which is a procedure S12.

* * * * *